L., A. & F. C. MARCELL.
ANIMAL TRAP.
APPLICATION FILED MAR. 6, 1915.
1,281,403.
Patented Oct. 15, 1918.
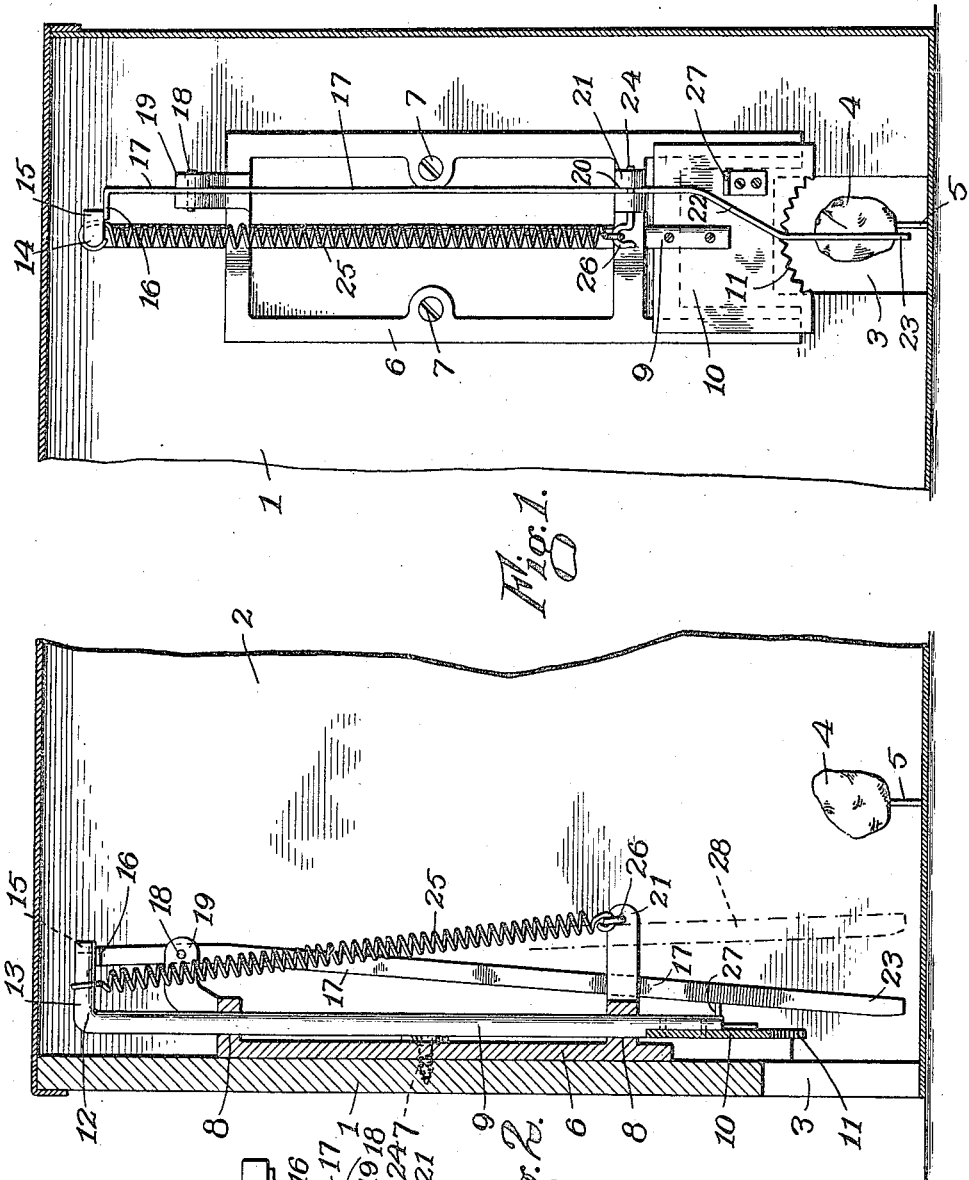

UNITED STATES PATENT OFFICE.

LAFAYETTE MARCELL AND ALFRED MARCELL, OF MILLBURY, AND FRANK C. MARCELL, OF WORCESTER, MASSACHUSETTS.

ANIMAL-TRAP.

1,281,403.

Specification of Letters Patent. Patented Oct. 15, 1918.

Application filed March 6, 1915. Serial No. 12,658.

*To all whom it may concern:*

Be it known that we, LAFAYETTE MARCELL and ALFRED MARCELL, both citizens of the United States, residing at Millbury, in the county of Worcester and Commonwealth of Massachusetts, and FRANK C. MARCELL, a citizen of the United States, residing at Worcester, in said county and Commonwealth, have invented a new and useful Improvement in Animal-Traps, of which the following is a specification, accompanied by drawings forming a part of the same.

Our invention relates to that class of animal traps which comprises an impaling plunger having a tripping mechanism which is operated by the passage of an animal beneath the plunger, and it consists in the novel construction and arrangement of parts as hereinafter described, the novel features being pointed out in the appended claim.

Referring to the accompanying drawings,

Figure 1 represents a front view of our improved trap.

Fig. 2 is a side view shown in central section, and

Fig. 3 is a top view.

Similar reference characters refer to similar parts throughout the different figures.

In Figs. 1 and 2 the trap is shown attached to a wooden framework 1, in the present instance representing one side of a box 2. Through the side 1 is an opening 3 affording passage into and out of the box 2 and giving access to a bait 4 mounted upon a spindle 5 in front of the opening. The trap consists of a rectangular metal framework 6 attached to the side 1 of the box by screws 7, 7. The metal frame work 6 is provided with bearing 8, 8, in vertical alinement to receive a slidable rod 9, to the lower end of which a plate 10 is attached forming a gate which, in its lowest position, closes the opening 3. The lower edge of the plate 10 is preferably concaved at its center and provided with a series of teeth 11, as represented in Fig. 1. The upper end of the rod 9 is bent at a right angle at 12 in a rearward direction forming a short horizontal arm 13, which is again bent at right angles at 14 in a horizontal direction forming a short tip 15 adapted to be engaged by the horizontal end 16 of a lever 17 pivoted at 18 in a lug 19 projecting from the rectangular metal framework 6. The lever 17 extends through a narrow slit 20 in a lug 21, projecting rearwardly from the metal framework 6, said slit 20 forming a guide for the lever 17, which is offset at 22 to bring the lower end 23 of the lever opposite the center of the opening 3, as represented in Fig. 1. A pin 24 is inserted in the lug 21 in position to permit a swinging movement of the lever 17 on its pivotal pin 18, but to prevent the withdrawal of the lever from the slit 20. An expansion, or pull-spring 25 connects the horizontal arm 13 with a hook 26 formed on the projecting end of the pin 24 and directly beneath the horizontal arm 13. Below the lug 21 is a short bracket 27 to facilitate the setting of the trap.

In order to set the trap the thumb is placed beneath the bracket 27 and a finger across the projecting lug 21. The thumb is then compressed to raise the plate 10 and rod 9 until the bracket 27 contacts with the lug 21 to allow the lever 17 to be swung toward the plate 10 sufficiently to carry the horizontal end 16 beneath the tip 15, of the rod 9, thereby supporting the plate 10 in its elevated position against the tension of the pull-spring 25. In this position of the lever 17 it rests against the bottom of the slit 20 which limits the movement of the lever 17 toward the plate 10, thereby enabling the operator to determine the proper elevation of the rod 9 and also the proper position of the lever 17 in order to engage the tip 15. The bottom of the slit 20, when the trap has been set, prevents it from being sprung by the passage of an animal outwardly through the opening 3. The passage of an animal inwardly through the opening 3, however, will move the lever 17 into the position indicated by broken lines 28, Fig. 2, thereby releasing the rod 9 and gate 10. Vertically sliding gates held in an elevated position against the tension of a spring by means of a pivoted lever serving as a trigger and capable of being released by the passage of an animal beneath the gate, have heretofore been proposed and we do not claim such broadly. Our present construction permits of a long pull spring 25 which exerts its force in a line nearly parallel with the rod 9. The friction between the horizontal arm 16 and the tip 15 is reduced to a minimum, and the swinging of the lever 17 is not resisted by the tension of the spring 25. The slotted lug 21 allows the pivotal connection of the lever 17 to work freely and the lug 21 serves as a stop to limit the elevation of the gate and enables the trap to be set in the dark. The length of the slot in the lug 21 limits the movement of the lever 17 in bringing the end 16 of the lever directly beneath the tip 15 of the rod 9.

We claim,

An animal trap comprising, in combination, a frame having bearings in vertical alinement, a rod slidable therein, having its upper end bent rearwardly to form a horizontal arm and laterally to form a horizontal tip, a lever pivoted on the frame and having its upper end bent horizontally and laterally toward said slidable rod, and a slotted lug on said frame having both ends of its slot closed and inclosing said lever, whereby the swinging movement of said lever is limited in both directions.

LAFAYETTE MARCELL.
ALFRED MARCELL.
FRANK C. MARCELL.

Witnesses:
NELLIE WHALEN,
PENELOPE COMBERBACH.

Copies of this patent may be obtained for five cents each, by addressing the "Commissioner of Patents, Washington, D. C."